United States Patent [19]

Nakamura et al.

[11] Patent Number: 5,188,652
[45] Date of Patent: Feb. 23, 1993

[54] MACHINE FOR MOLDING OPTICAL ELEMENT

[75] Inventors: Shoji Nakamura; Takasi Inoue, both of Hirakata; Masaaki Sunohara, Nishinomiya; Tadao Shioyama, Sakurai, all of Japan

[73] Assignee: Matsushita Electric Industrial Co., Ltd., Osaka, Japan

[21] Appl. No.: 782,363

[22] Filed: Oct. 24, 1991

[30] Foreign Application Priority Data

| Oct. 26, 1990 [JP] | Japan | 2-288688 |
| Jun. 4, 1991 [JP] | Japan | 3-132583 |
| Jul. 10, 1991 [JP] | Japan | 3-169949 |

[51] Int. Cl.$^5$ .................................. C03B 11/08
[52] U.S. Cl. .................................. 65/319; 65/64; 65/32.1; 65/286; 65/162
[58] Field of Search .............. 65/64, 76, 286, 32.1, 65/157, 319, 162

[56] References Cited

U.S. PATENT DOCUMENTS

| 4,836,838 | 6/1989 | Hirota et al. | 65/308 |
| 4,913,718 | 4/1990 | Yoshimura et al. | 65/104 |
| 4,915,720 | 4/1990 | Hirota et al. | 65/64 |

FOREIGN PATENT DOCUMENTS

| 0356068 | 2/1990 | European Pat. Off. |
| 58-84134 | 5/1983 | Japan |
| 60-200833 | 10/1985 | Japan |
| 61-26528 | 2/1986 | Japan |
| 62-292629 | 12/1987 | Japan |
| 62-292636 | 12/1987 | Japan |
| 63-139019 | 6/1988 | Japan |
| 2-34526 | 2/1990 | Japan |
| 2-157128 | 6/1990 | Japan |

Primary Examiner—Robert L. Lindsay
Attorney, Agent, or Firm—Wenderoth, Lind & Ponack

[57] ABSTRACT

A machine is provided for molding an optical element by using a molding block having upper and lower molding dies, a sleeve die and a glass blank combined integrally with each other. The machine includes a chamber which accommodates a heating zone having a plurality of sections for heating the molding block from above and below, a deformation zone for pressing the molding dies and a cooling zone having a plurality of sections for cooling the molding block. The chamber is formed with an inlet and an outlet for the molding block. The sections of the heating zone, the deformation zone and the sections of the cooling zone are provided independently of one another. A transport member is provided for sequentially transporting the molding block through the heating zone, the deformation zone and the cooling zone, and first and second shutters are provided for opening gas supply member is provided for introducing nonoxidizing gas into the chamber.

11 Claims, 11 Drawing Sheets

MACHINE FOR MOLDING OPTICAL ELEMENT

BACKGROUND OF THE INVENTION

The present invention relates to a molding machine for mainly press molding a high precision optical element and a method of producing the optical element by using the molding machine.

Recently, in production of an optical element represented by an optical lens, a number of attempts have been made in which the optical element is obtained by press molding through cancellation of a polishing process. Thus, at present, press molding of the optical element is used for mass production by several optical lens makers. In the most efficient of the known methods for press molding optical elements, molten glass material is poured into a die and then, is press molded. However, in this known method, it is difficult to accurately control contraction of glass during cooling of glass and thus, a high precision optical element cannot be produced efficiently. This is because the temperature difference between the melting point of about 1,300° C. at which glass is molten and the transition point at which glass is set is too large. Therefore, an extremely large period is required for cooling glass. Thus, even if a high precision optical element is obtained, this known method is problematical in view of its efficiency. Accordingly, in a general known molding method, a glass blank is preliminarily worked into a certain shape and then, is supplied between molding dies so as to be press molded through heating as described in, for example, Japanese Patent Laid-Open Publication Nos. 58-84134 (1983) and 60-200833 (1985).

Japanese Patent Laid-Open No. 61-26528 (1986) discloses a machine for pressing a lens, which is constituted by an inlet chamber for a glass preform, a heating chamber, a pressing chamber, a gradual cooling chamber and an outlet chamber for the lens. In this known machine, the machine housing as a whole should be adapted to be evacuated to vacuum and a number of molding dies are employed so as to raise production rate. However, this known machine is quire expensive because the machine housing as a whole should be evacuated to vacuum. Furthermore, since a number of the molding dies machined with high precision are employed, production cost of the lens rises considerably.

Meanwhile, Japanese Patent Laid-Open Publication No. 62-292629 (1987) discloses a machine in which processes of heating, pressing and cooling molding dies can be performed in an identical chamber and the molding dies are heated efficiently from above and below. However, productivity of this prior art machine is low due to its intermittent transport of the molding dies. Furthermore, this prior art machine has a drawback that a large uniform heating portion of a heat source cannot be obtained.

Japanese Patent Laid-Open Publication Nos. 62-292636 (1987) and 2-34526 (1990) discloses a machine in molding dies are heated and cooled from one side. Thus, the conventional machine has such problems that the molding dies cannot be heated and cooled efficiently and that since a temperature difference occurs in a vertical direction of the molding dies, lenses having stable performance cannot be obtained.

Furthermore, U.S. Pat. No. 4,913,718 discloses a machine in which a glass blank and molding dies are separately heated on an identical pallet and the glass blank in a high-temperature state is supplied into the molding dies so as to be press molded. However, this known machine is necessarily structurally complicated and expensive due to the need for it to handle glass blanks at high temperatures, etc.

As is seen from the foregoing, the prior art documents do not give detailed descriptions of temperature distribution and uniform heating of the glass blank, the molding dies, the heat source, etc., on which performance of the molded item directly relies.

SUMMARY OF THE INVENTION

Accordingly, an essential object of the present invention is to provide not only an inexpensive and highly efficient molding machine for molding an optical element, which is simple in structure and is capable of performing remarkably uniform heating, but also a high efficient method of producing the optical element.

In order to accomplish this object of the present invention, a machine for molding an optical element by using a molding block in which upper and lower molding dies, a sleeve die for supporting the molding dies and a glass blank are integrally combined with each other, according to one aspect of the present invention, comprises a chamber which accommodates a heating zone for heating the molding block from above and below, a deformation zone for pressing the molding dies of the molding block and a cooling zone for cooling the molding block. The chamber is formed with an inlet for loading the molding block into the chamber and an outlet for discharging the molding block from the chamber. The heating zone includes a plurality of sections, and the cooling zone includes a plurality of sections, such that the sections of the heating zone, the deformation zone and the sections of the cooling zone are provided independently of one another. A transport means is provided for sequentially transporting the molding block through the heating zone, the deformation zone and the cooling zone. First and second shutters are provided for opening and closing the inlet and the outlet, respectively, and a gas supply means is provided for introducing nonoxidizing gas into the chamber.

Furthermore, a method of producing an optical element, according to another aspect of the present invention, comprises: a first step of integrally combining upper and lower molding dies, a sleeve die for supporting the molding dies and a glass blank with each other so as to obtain a molding block; a second step of heating the heating block from above and below once or a plurality of times; a third step of pressing glass blank through the molding dies once or a plurality of times so as to deform the glass blank; and a fourth step of cooling the molding block from above and below once or a plurality of times; the second to fourth steps being continuously performed in a nonoxidizing atmosphere in an identical chamber.

In the present invention, since a plurality of independent temperature control means and pressure control means are provided in the chamber, the molding block which has a predetermined heat capacity can be accurately heated, pressed for deformation and cooled uniformly at an extremely high thermal efficiency in a predetermined period.

In accordance with the machine of the present invention, since the glass blank can be heated, pressed for deformation and cooled at a high thermal efficiency, the highly accurate optical element can be press molded in a short period. Meanwhile, the machine is made simple in structure and compact in size. Furthermore, since sealing is not required in the machine, the machine is suitable for mass production at low cost.

Meanwhile, in accordance with the method of the present invention, an optical element having a highly accurate shape can be produced at low cost. As a result, an optical apparatus incorporating the optical element can be operated stably and produced at low cost.

BRIEF DESCRIPTION OF THE DRAWINGS

This object and features of the present invention will become apparent from the following description taken in conjunction with the preferred embodiment thereof with reference to accompanying drawings, in which:

FIG. 5b is a graph indicative of effects of the heat insulating plates of FIG. 5a;

FIG. 7 is a perspective view of the heat insulating plate shown in FIG. 5a;

FIG. 10 is a graph showing a temperature curve for the molding block of FIG. 9a.

Before the description of the present invention proceeds, it is to be noted that like parts are designated by like reference numerals throughout several views of the accompanying drawings.

DETAILED DESCRIPTION OF THE INVENTION

Figure 1:
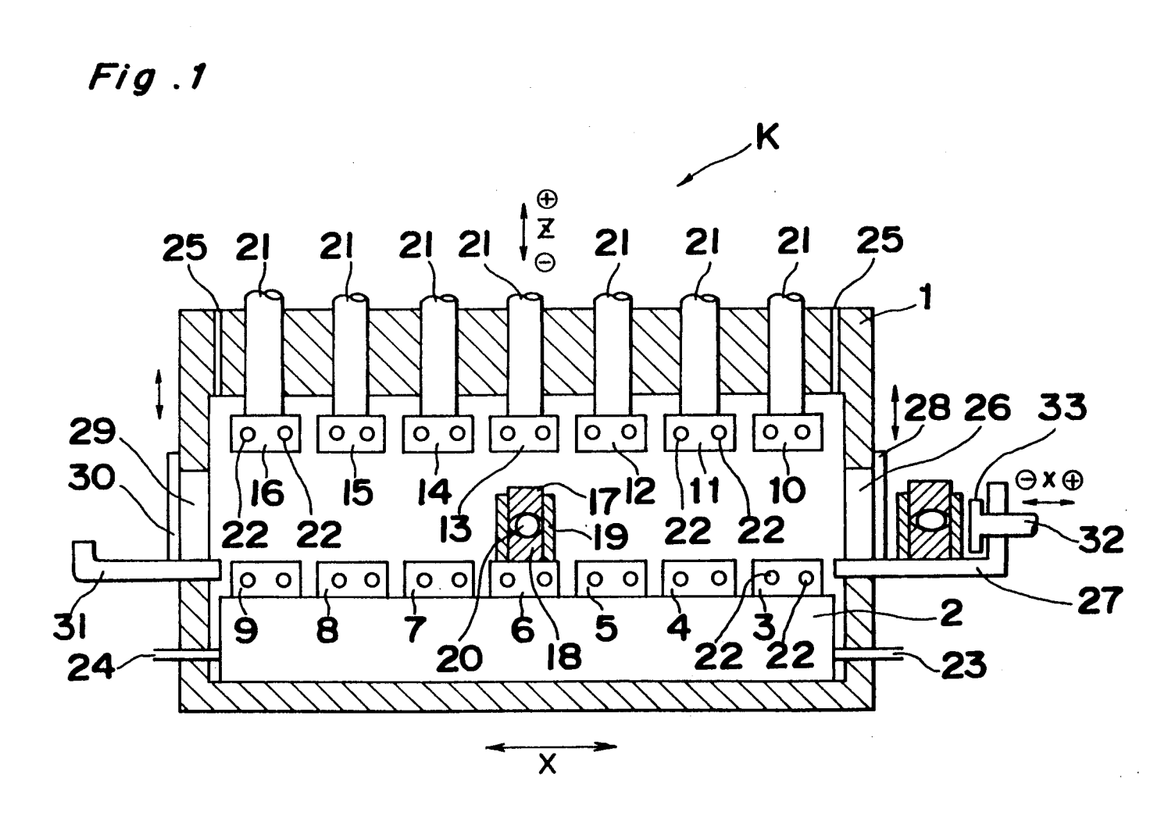
FIG. 1 is a sectional front elevational view of a machine for molding an optical element, according to one embodiment of the present invention.

Referring now to the drawings, there is shown in FIG. 1, a machine K for molding an optical element, according to one embodiment of the present invention. The machine K includes a chamber 1 in which a base 2 is accommodated. Lower heating plates 3-9 are securely mounted on the base 2 so as to be arranged in a line extending in the X-axis direction in FIG. 1. Each of the lower heating plates 3-9 is provided with a pair of heaters 22 acting as a temperature control means. Meanwhile, upper heating plates 10-16 are provided above the lower heating plates 3-9 so as to confront the lower heating plates 3-9, respectively. Each of the upper heating plates 10-16 is also provided with a pair of the heaters 22 acting as a temperature control means and a press rod 21 of a cylinder, which acts as a pressure control means. The upper heating plates 10-16 and the lower heating plates 3-9 are spaced apart by a distance which allows a molding block to pass therethrough. The molding block is constituted by an upper die 17, a lower die 18, a sleeve die 19 for supporting the upper and lower dies 17 and 18. A glass blank 20 is gripped between the upper and lower dies 17 and 18.

A heating zone for heating the molding block is formed by the lower heating plates 3-5 and the upper heating plates 10-12. A pressing deformation zone for deforming the glass blank 20 is formed by the lower heating plate 6 and the upper heating plate 13. Meanwhile, a cooling zone for cooling the molding block is formed by the lower heating plates 7-9 and the upper heating plates 14-16. Each of the upper heating plates 10-16 is arranged to move vertically i.e. in th Z-axis direction in FIG. 1, through a predetermined stroke.

A pair of the heaters 22 is embedded in each of the heating plates 3-16 so as to provide for a desired temperature increase of the heating plates 3-16. A cooling circuit is incorporated in the base 2 and has a cooling water inlet 23 and a cooling water outlet 24 which are connected with an external temperature controller (not shown). Although not specifically shown, cooling water is incorporated in an outer wall of the chamber 1 so as to prevent a temperature increase of the outer wall of the chamber 1, so as to ensure safety during the molding operation.

In this embodiment, the number of lower heating plates 3-9, and the number of upper heating plates 10-16 is set at seven. The reason why seven lower heating plates (and seven upper heating plates 10-16) are provided will be described later. Furthermore, a thermocouple 44 (FIG. 3) is embedded in the heating plates 3-16 so as to detect and control temperature of the heating plates 3-16.

In order to control the atmosphere in the chamber 1, two gas inlets 25 for introducing nonoxidizing gas into the chamber 1 are formed at opposite ends of an upper portion of the chamber 1, respectively. In order to enable transport of the molding block along the lower heating plates 3-7, upper faces of the lower heating plates 3-9 are made flush with each other. An inlet 26 and an outlet 29 which enable the molding block to be moved through the chamber 1 therethrough are respectively, provided at opposite ends of the chamber 1. The lower heating plate 3 is connected, through the inlet 26 to the outside of the chamber 1 by a loading platform 27. A shutter 28 is vertically movably provided at the inlet 26 so as to open and close the inlet 26. On the other hand, the lower heating plate 9 is connected, through the outlet 29, to the outside of the chamber 1 by a discharge platform 31. A shutter 30 is vertically movably provided at the outlet 29 so as to open and close the outlet 29. When the molding block is pushed a predetermined distance in the X-axis (−) direction in FIG. 1 by a push rod 33 of a cylinder 32, the molding block is transported from the loading platform 27 onto the lower heating plate 3 in the chamber 1.

Figure 2:
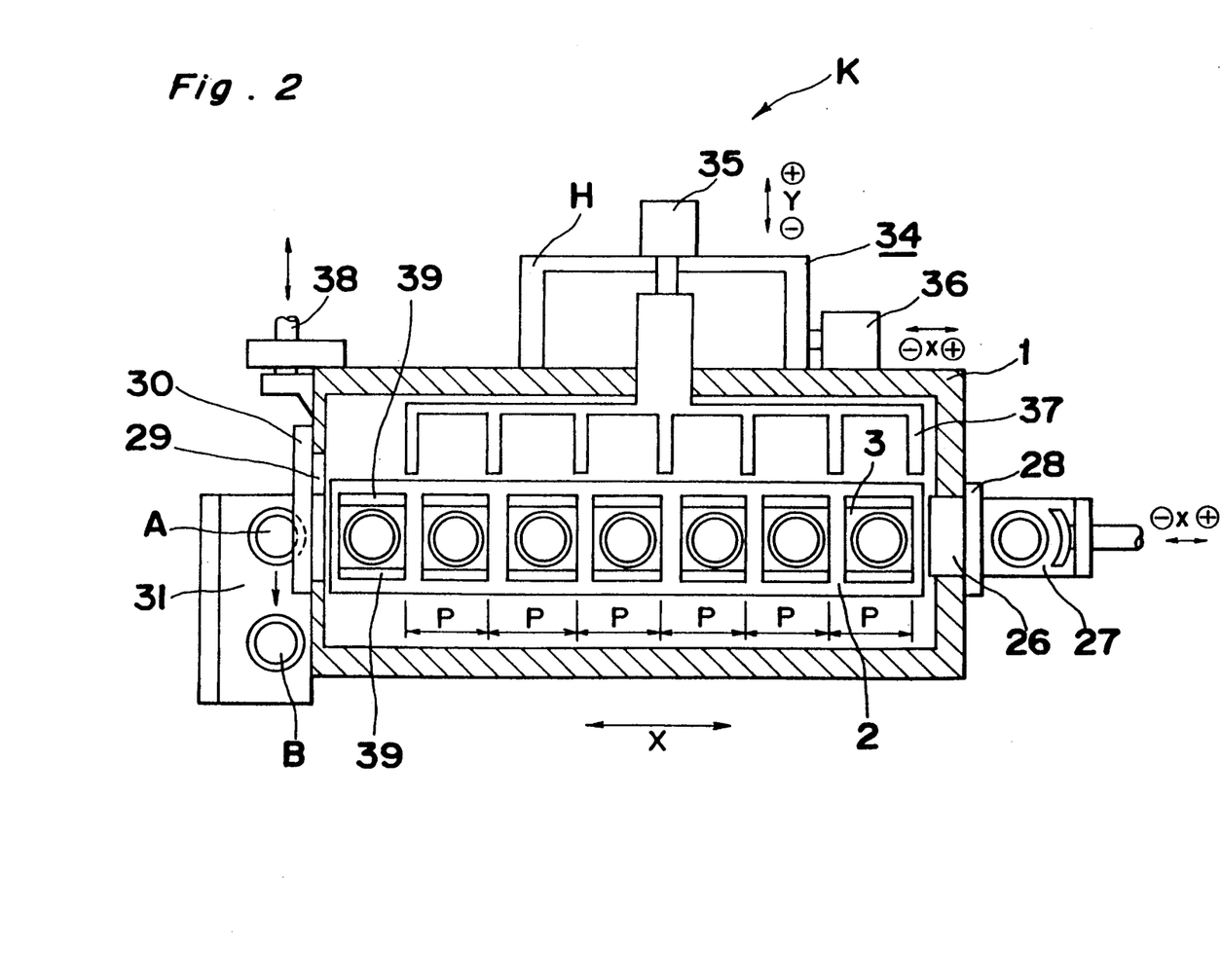
FIG. 2 is a sectional top plan view of the machine of FIG. 1.

FIG. 2 shows a transport device 34 for transporting the molding block among the lower heating plates 3-9. The transport device 34 includes drive cylinders 35 and 36 provided at a rear portion of the chamber 1 and a pusher 37 having a comb-like shape. The molding block is transported through a distance equal to a pitch P of the heating plates 3-16 in the X-axis direction and a predetermined distance in the Y-axis direction by the pusher 37 upon actuation of the drive cylinders 35 and 36. The drive cylinder 35 is attached to a cylinder housing H and the drive cylinder 36 is fixed to a rear face of the chamber 1 so as to displace the cylinder housing H is slidably mounted on the rear face of the chamber 1 so as to be slightly sealed relative to the rear face of the chamber 1.

Figure 3:
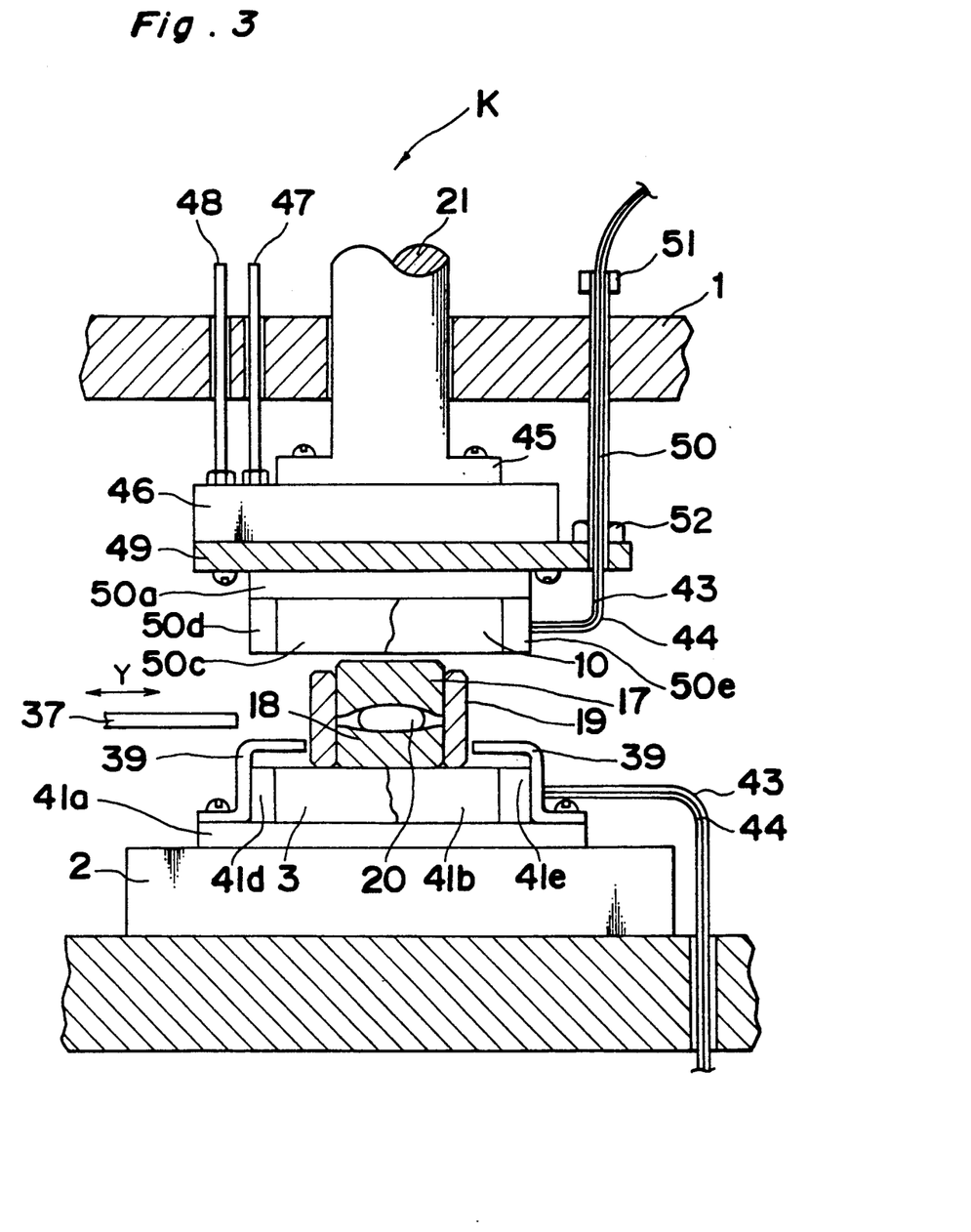
FIG. 3 is a sectional side elevational view of the machine of FIG. 1.
Figure 4:
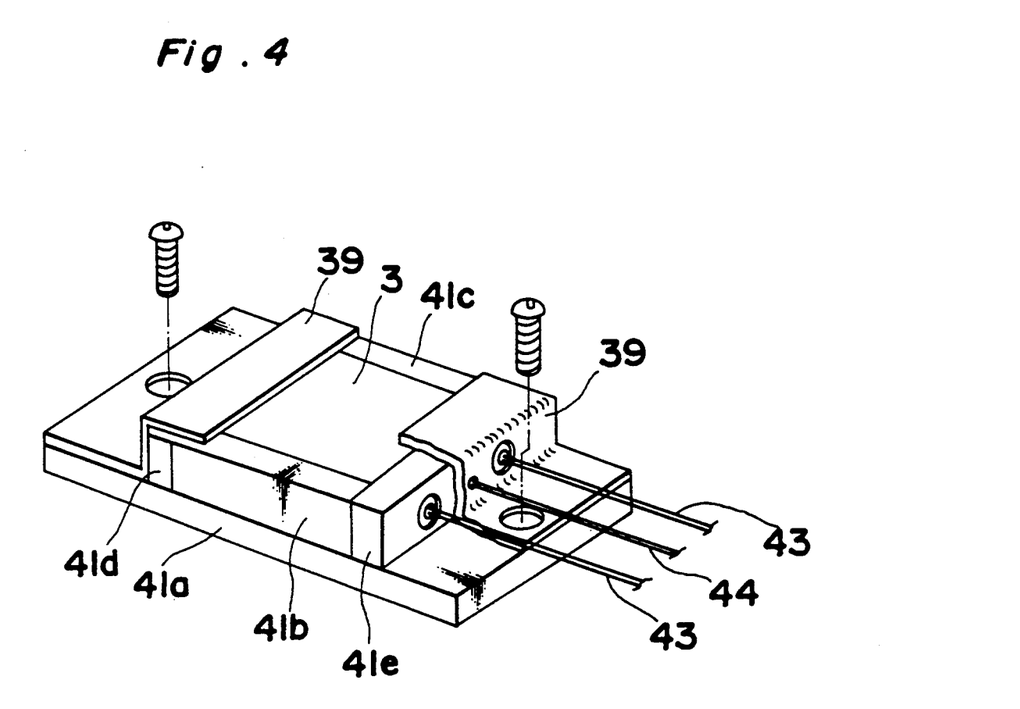
FIG. 4 is a perspective view of a lower heating plate employed in the machine of FIG. 1.

FIGS. 3 and 4 show detailed arrangements of the heating plates 3–16, which are the most essential constituent elements of the present invention. Each of the heating plates 3–16 has an identical rectangular shape. Thus, by way of example, the lower heating plate 3 and the upper heating plate 10 are shown in FIGS. 3 and 4. As shown in FIGS. 3 and 4, a heat insulating plate 41a and the lower heating plate 3 are securely piled on the base 2 in this order. Furthermore, a pair of guides 39 for positioning the molding block in the Y-axis direction in FIG. 3 are secured to the heat insulating plate 41a. By using the transport device 34 referred to above, the molding block is slidably moved between the guides 39 and from one lower heating plate to the next lower heating plate. As shown in FIG. 4, four side faces and a bottom face of the lower heating plate 3 are surrounded by heat insulating plates 41b–41e and the heat insulating plate 41a, respectively. The heat insulating plates 41a–41e are provided such that (1) the lower heating plate is not effected by even minute temperature changes of the cooling circuit incorporated in the base 2, (2) the temperature of each of the lower heating plates can be accurately controlled independently of the two neighboring lower heating plates and (3) heat dissipation from the lower heating plate 3 through convection of the nonoxidizing gas in the chamber 1 is prevented so as to uniformly heat the molding block. One vital point in molding of an optical element is that the molding block and the glass blank 20 be uniformly heated and cooled. To this end, it is important to reduce the temperature difference between the surfaces of the upper and lower heating plates so as to increase a uniform heating area.

Figure 5A:
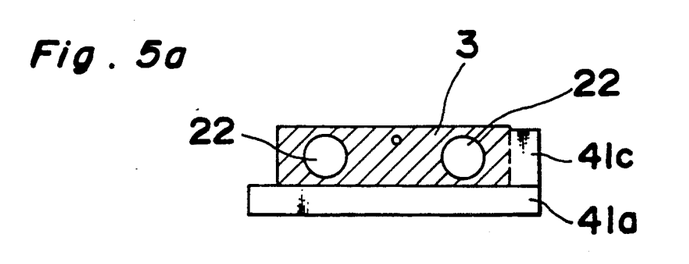
FIG. 5a is a fragmentary sectional view of heat insulating plates employed in the machine of FIG. 1.
Figure 5B:
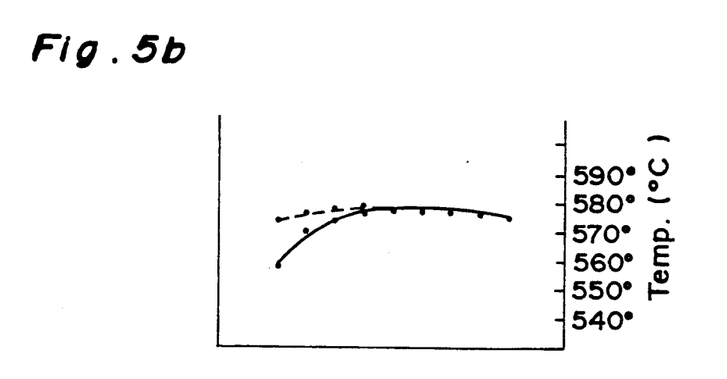

FIGS. 5a and 5b illustrates how uniformity of heating is achieved by the heat insulating plates 41a–41e. Namely, FIG. 5b shows temperatures of the surface of the lower heating plate 3 when the lower heating plate 3 is set to 580° C., the temperatures being measured by an infrared radiation thermometer. As shown by the solid line in FIG. 5b, at the left portion in FIG. 5b, the temperature of the surface of the lower heating plate 3 is about 20° C. lower than the set temperature of 580° C., thus resulting in improper uniformity of heating. This improper uniformity of heating is mainly caused by heat dissipation from the surface of the lower heating plate 3. Meanwhile, the broken line in FIG. 5b shows that uniform heating is obtained by mounting the heat insulating plate 41b on the lower heating plate 3 and is about 4° C. lower than the set temperature of 580° C., thereby resulting in substantially uniform heating. Such uniform heating should be ensured over a large area of the lower heating plate, with which the lower die 18 comes into contact. Examination of temperatures in the above mentioned area of the lower heating plate 3 based on a similar measuring method has revealed that uniform heating similar to that illustrated by the broken line of FIG. 5b is obtained.

On the other hand, the upper heating plates 10–16 are arranged in a manner basically similar to that of the lower heating plates 3–9. As shown in FIG. 3, a cooling plate 46 is secured to a lower face of a flange 45 of the press rod 21 with screws. A cooling circuit (not shown) is provided in the cooling plate 46 and includes metal pipe 47 and 48 which are fixed to the cooling plate 46 with screws. The pipe 48 is connected with an external temperature controller (not shown). Temperature adjusting water is poured into the pipe 47 so as to be discharged from the pipe 48. The pipes 47 and 48 are vertically slidably provided so as to be vertically displaced upon vertical travel of the press rod 21. A mounting plate 49 is mounted on a lower face of the cooling plate 46 with screws. Furthermore, in the same manner as for the lower heating plate 3, the upper heating plate 10 is fixed, through a heating insulating plate 50a, to the mounting plate 49 with screws, and four side faces of the upper heating plate 10 are surrounded by heat insulating plates 50b–50e, respectively, such that effects identical with those of the lower heating plate 3 can be achieved by the upper heating plate 10. Since the heating plates 3–16 are provided independently of each other as described above, replacement of the heating plates 3–16 during maintenance necessary due to lapse of service life of the heaters 22, etc. is facilitated.

As shown in FIG. 3, the mounting plate 49 is used not only for securing the upper heating plate 10 and the heat insulating plate 50a but also for relaying lead wires 43 of the heaters 22 and the thermocouple 44. The lead wires 43 and the thermocouple 44 extending from an end face of the upper heating plate 10 are passed through a sleeve 50 which is secured to the mounting plate 49 with a screw 52. At an upper end of the sleeve 50, the lead wires 43, the thermocouple 44 and the sleeve 50 are fixed to one another by a fastener 51. In the same manner as for the pipes 47 and 48, the sleeve 50 is vertically slidably provided so as to be vertically displaced upon vertical movement of the press rod 21.

As described above, the pipes 47 and 48 and the sleeve 50 having the lead wires 43 and the thermocouple 44 extending therethrough are slidably provided for the following reason. Namely, since the lead wires 43 are exposed to rather high temperatures in the vicinity of the upper heating plate 10 having the heaters 22 embedded therein and bending stress due to vertical travel of the press rod 21, breaking of the lead wires 43 is likely to take place unless the pipes 47 and 48 and the sleeve 50 are slidably provided. The wires 43 are held in the movable sleeve 50 in the chamber 1 and bending of the wires 50 due to vertical movement of the sleeve 50 can be absorbed outside the chamber 1 at a large radius of curvature at room temperature. Therefore, breaking of the wires 43 is less likely to occur, thereby resulting in remarkable improvement of reliability of the machine K.

Figure 6:
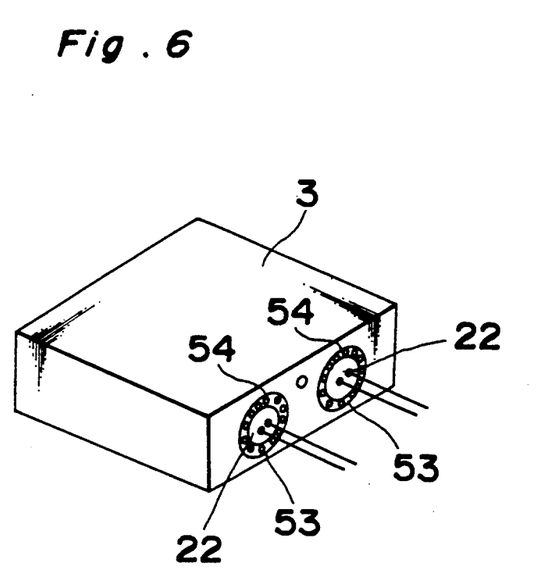
FIG. 6 is a perspective view showing a heating plate and heaters employed in the machine of FIG. 1.

FIG. 6 illustrates the relationship between the heating plates 3–16 and the heaters 22. This arrangement also aims at improving uniform heating of the heating plates 3–16. Since the heating plates 3–16 have identical arrangements, only the lower heating plate 3 is described hereinbelow. The heating plate 3 is made of metal having excellent heat resistance and oxidation resistance, for example, stainless steel SUS316 of JIS (Japanese Industrial Standards) corresponding to ASTM-73. Two through-holes 53 are formed in the heating plate 3, and a cylindrical cartridge type heater (i.e. heater 22) is inserted into each of the through-holes 53 via abrasive grains 54. In order to provide the abrasive grains 54 in this embodiment, powder in which zirconium oxide is mixed with aluminum oxide, silicon carbide, etc. having uniform grain size suitable for lapping is dissolved in water and is then filled in a gap between the through-hole 53 and the heater 22, and is allowed to dry. The abrasive grains 54 are filled in the gap between the through-hole 53 and the heater 22 so as to provide the following effects (1) to (3).

(1) The gap between the outer peripheral surface of the heater 22 and the peripheral surface of the through-hole 53 is made uniform such that heat conduction from the heater 22 is made uniform.

(2) Seizure between the heater 22 and the heating plate 3 is prevented and replacement of the heater 22 when the lead wire 43 breaks is facilitated.

(3) Error in the outside diameter of the heater 22 and machining error of the through-hole 53 are compensated for.

Due to the effects (1) to (3), uniform heating and easy maintenance of the heating plates 3-16 can be ensured. Uniform heating of the heating plates 3-16 is degraded by deviation of the heater 22 from a central position in the through-hole 53 to a degree substantially identical with that of the case of when the heat insulating plates are removed. Meanwhile, in order to compensate for machining error of the through-hole 53, the grain size of the abrasive grains 54 may be selected on the basis of the size of the gap between the heater 22 and the through-hole 53.

In a conventional arrangement in which ceramic adhesive is filled in the gap between the heater and the heating plate, the above effects (1) and (3) can be achieved but the effect (2) cannot be obtained at all. Thus, the above arrangement of the present invention ensures not only uniform heating but also easy maintenance. Accordingly, when the arrangements of FIGS. 5 and 6 are combined with each other, the upper and lower heating plates 3-16 exhibit excellent uniform heating properties.

Figure 7:
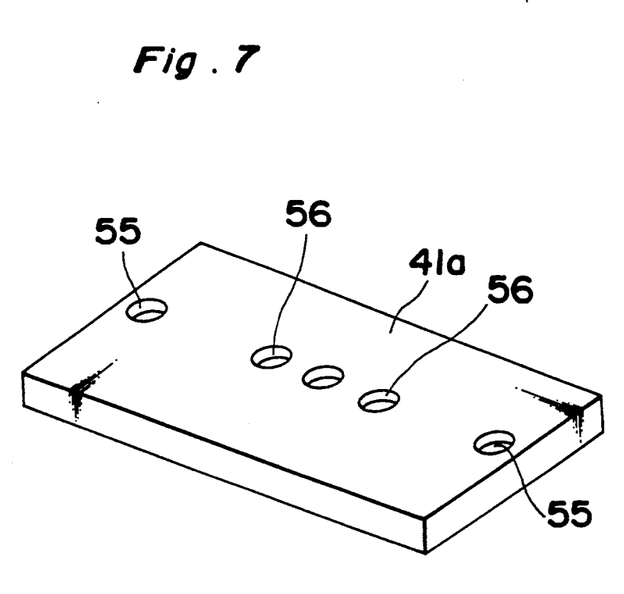

FIG. 7 shows the heat insulating plate 41a provided under the lower heating plate 3. The heat insulating plate 41a is formed with two screw holes 55 for mounting the heat insulating plate 41a on the base 2 and three mounting holes 56 for mounting the heat insulating plate 41a on the heating plate 3. Characteristics required of the heat insulating plate 41a are long service life including heat insulation, heat resistance, thermal shock resistance, pressure resistance and excellent machining properties. In this embodiment, the heat insulating plate 41a is formed by a vitrified wheel mainly consisting of aluminum oxide and silicon oxide, taking the following into account. Namely, commercially available ceramic heat insulating material satisfies the above mentioned characteristics at an initial stage. However, in the machine K, the heat insulating plate 41 is subjected to frequent increases and decreases in temperature and is pressed repeatedly. Furthermore, thermal shock is applied to the heat insulating plate 41a in the direction of thickness of the heat insulating plate 41a due to temperature differences of about 600° C. Thus, if the heat insulating plate 41a is made of ceramic insulating material, the service life of the heat insulating material 41a is extremely short. In this embodiment, the heat insulating plate 41a is formed by a wheel which is made of 78% aluminum oxide, 20% silicon carbide, 1.5% potassium oxide, 1% sodium oxide and 0-0.5% calcium oxide, and has a porosity of 39.5% and a heat resistance temperature of 1,300° C.

For comparison, the heat insulating plate 41a formed by the above wheel and a conventional heat insulating plate made of commercially available ceramic insulating materials are mounted on the machine K. Evaluation of their service life has shown that the service life of the heat insulating plate 41a is quite different from that of the conventional heat insulating plate after operation of the machine K for one month. Minute cracks are produced in the conventional heat insulating plate so as to prevent the conventional heat insulating plate from maintaining its original form. On the other hand, substantially no cracks are found in the heat insulating plate 41a even after operation of the machine K for one year. Generally, most heat insulating materials contain gas (air in many cases) in the solid and are based on the principle that the coefficient of thermal conductivity of gas is lower than that of solid. Since the wheel having components suitable for heat insulation is highly porous, is an excellent heat insulating material, and is thermally stable, the heat insulating plate 41a is excellent in terms of its service life.

Meanwhile, in this embodiment, the heat insulating plate 41a is mainly made of aluminum oxide. However, even if the heat insulating plate 41a is mainly made of silicon carbide, the heat insulating plate 41 exhibits the same effects as those of the heat insulating plate 41a made mainly of aluminum oxide. Furthermore, because the wheel which has been conventionally used as a grinding tool is used as a high-temperature heat insulating material, the field of application of the wheel is expanded.

Figure 8:
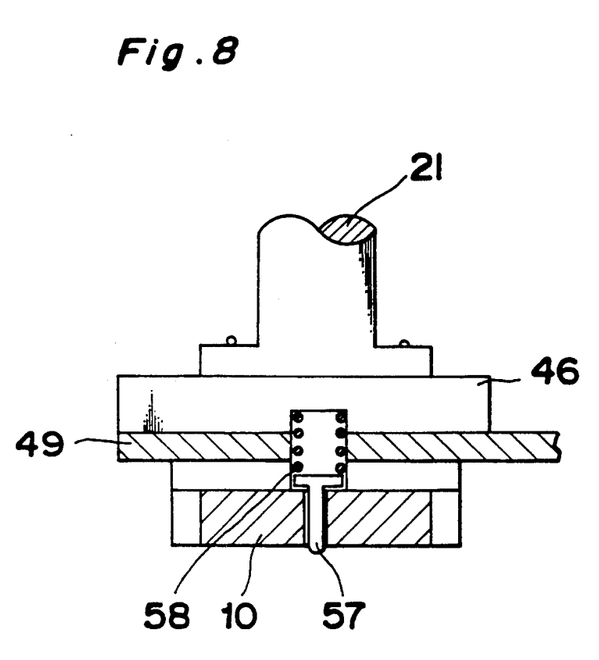
FIG. 8 is a fragmentary sectional view explanatory of an upper heating plate employed in the machine of FIG. 1.

FIG. 8 shows an example of the upper heating plates 10-16, for example, the upper heating plate 10. A release pin 57 for releasing the heating plate 10 from the upper dies 17 is embedded at a central portion of the heating plate 10. Since a lower face of the heating plate 10 and an upper face of the upper die 17 are precisely machined so as to be brought into contact with each other, the upper die 17 is lifted upwardly by suction or close contact with the heating plate 10, especially at the time of completion of deformation of the glass blank 20. Therefore, molding of the glass blank 20 cannot be performed properly unless the release pin 57 is provided. The release pin 57 is urged by a compression spring 58 so as to project out of the lower face of the heating plate 10 by about 1 mm. Suction and close contact of the upper die 17 with the heating plate 10 is forcibly eliminated by the compression spring 58. An urging force of the compression spring 58 is set at a value which will not cause degradation in the performance of the molded lens, for example, 200 g-f approximately. Meanwhile, in this embodiment, the urging force of the compression spring 58 is employed for releasing the heating plate 10 from the upper die 17. However, this arrangement can be replaced by a method in which grooves are formed on the lower face of the heating plate 10 so as to reduce the contact area between the lower face of the heating plate 10 and the upper face of the upper die 17 or a method in which gas pressure is employed for releasing the heating plate 10 from the upper die 17.

Hereinbelow, a method of producing, by using the machine K, an optical element represented by a lens, according to another aspect of the present invention is described with reference to FIGS. 1-2 and 9-11 and Table 1. The molding block is obtained by inserting the glass blank 20 in the upper die 17, the lower die 18 and the sleeve die 19 and is placed on the loading platform 27. As illustrated in FIG. 2, the molding block disposed at the position A on the discharge platform 31 is displaced to the position B in the direction of the arrow by a piston 38 of a cylinder and then, the piston 38 is returned to its original position. Subsequently, by driving the drive cylinder 35 through a predetermined distance in the Y-axis (−) direction and simultaneously opening the shutter 30, the pusher 37 is moved in the Y-axis (−) direction such that each of teeth of the pusher 37 is inserted between a pair of the neighboring molding blocks placed on the heating plates 3-9. Thereafter, the drive cylinder 36 is driven in the X-axis (−) direction such that each of the molding blocks on the heating plates 3-9 is transported to the next one of the heating plates 3-9. For example, the molding block on the heating plate 9 for cooling is passed through the outlet 29 so as to be transported onto the discharge platform 31. Then, the pusher 37 is returned to its original position by movement first in the Y-axis (+) direction and then in the X-axis (−) direction and, at the same time, the shutter 30 is closed.

Subsequently, the shutter 28 of the inlet 26 is opened and the molding block on the loading platform 27 is displaced in the X-axis (−) direction by the push rod 33 of the cylinder 32 so as to be transported onto the heating plate 3 in the chamber 1. Simultaneously with return of the push rod 33 to its original position, the shutter 28 is closed. These actions are sequentially repeated at a predetermined interval such that molding of lenses is performed continuously.

During opening of the shutters 28 and 30, nonoxidizing gas (e.g. N₂ gas) having a predetermined pressure is supplied into the chamber 1 from the gas inlets 25 so as to raise the internal pressure of the chamber 1. During opening of the inlet 26 and the outlet 29 or through gaps of the cylinders, the gas flows out of the chamber 1 but does not adversely affect molding of the lens. This is because at the time of loading discharge of the molding block, either one of the shutters 28 and 30 provided at the opposites ends of the chamber 1 is closed for the following reason. Namely, if both of the shutters 28 and 30 are opened simultaneously, the balance of internal pressure of the chamber 1 is destroyed, external air flows into the chamber 1, and it becomes impossible to perform molding of the lens in a stable atmosphere. In case both of the shutters 28 and 30 are opened simultaneously, the concentration of oxygen assumes a maximum of 0.1% or more and varies greatly in sync with the opening and closing of the shutters 28 and 30. On the other hand, if other one of the shutters 28 and 30 is closed, the concentration of oxygen usually assumes 0.04% or less.

At the same time when the molding block transported into the chamber 1 is placed on the heating plate 3, the heating plate 10 is lowered so as to come into contact with the upper die 17 of the molding block such that the molding block is heated from above and below efficiently. In the heating zone, a plurality of the lower heating plates 3-5, and a plurality of the upper heating plates 10-12, are provided for the following purposes (1) to (3).

(2) Before the glass of the glass blank 20 reaches a deformation temperature, the upper and lower dies 17 and 18, the sleeve die 19 and the glass blank 20 having heat conductivities are uniformly heated from above and below without vertical temperature differences.

(2) Temperatures of the upper and lower heating plates, which have been lowered by the molding block, are returned to the heating temperature in a predetermined period.

(3) The external appearance of the molded lens is determined by substance scattered from the glass of the glass blank 20. In order to prevent scatter of the substances from the glass blank 20, conditions for a minimum deformation temperature of glass re obtained. To this end, heat capacity and electric power of the upper and lower heating plates, as well as the coefficient of thermal conductivity and the heat capacity, etc. of the molding block are, needless to say calculated.

In FIG. 2, when the pusher 37 is displaced in the Y-axis (−) direction and then in the X-axis (−) direction by a predetermined pitch, the molding block placed on one lower heating plate is transported along the guides 39 by the predetermined pitch in the X-axis (−) direction so as to be placed on the next heating plate. Subsequently, the pusher 37 is retracted in the Y-axis (+) direction and then is returned in the X-axis (+) direction by the predetermine pitch, whereby transport of the molding block is completed. In the heating zone, the molding block is set in a waiting state on the lower heating plates 3-5 for a predetermined period so as to be heated from above and below by the upper and lower heating plates 10-12 and 3-5 during the predetermined waiting period. In the heating zone, each of the molding blocks is sequentially transported at a predetermined interval so as to be heated. Thus, when the molding block has reached such a temperature as to enable its deformation, heating of the molding block is completed.

Subsequently, the molding block is transported onto the heating plate 6 of the pressing deformation zone by the transport means 34 referred to earlier. In the pressing deformation zone, the lower heating plate 6 and the upper heating plate 13 are also set to such a temperature as to enable its deformation. Upon transport of the molding block onto the lower heating plate 6, the upper heating plate 13 is pushed in the Z-axis (−) direction by the push rod 21 so as to come into contact with the sleeve die 19 such that the glass blank 20 is deformed. After predetermined period after completion of deformation of the glass blank has elapsed the press rod 21 is lifted in the Z-axis (+) direction.

Thereafter, the molding block is transported onto the lowering heating plate 7 of the cooling zone. Then the upper heating plate 19 is brought into contact with the molding block such that the molding block is uniformly cooled from above and below. Subsequently, the molding block is transported onto the lower heating plate 8 so as to be further cooled. Geometrical accuracy of the molded lens is determined especially by how satisfactorily the glass blank 20 is cooled in the vicinity of a transition point of glass at the above mentioned two cooling steps on the lower heating plates 7 and 8.

In this embodiment, in the second cooling step, the heating plates 8 and 15 are set at a temperature lower than the transition point of glass. The cooling speed of the molding block is high immediately after transporting the molding block onto the lower heating plate 8, but gradually drops over time. Thus, the temperature of the molding block passes through the transition point of glass in a predetermined period and the molding block is further cooled to reach a temperature identical with that of the upper and lower heating plates 15 and 8. Moreover, the molding block is rapidly cooled by the heating plates 9 and 16 to a temperature which will enable its discharge. After the three cooling steps on the lower heating plates 7-9, the molding block is carried onto the discharge platform 31. As described above, the molding block is sequentially fed through a total of seven steps of heating, pressing deformation and cooling at predetermined intervals, whereby molding of the lens is completed.

In this embodiment, a pair of the upper and lower heating plates are set at a predetermined temperature and the production rate is set such that the temperature difference between the molding block and the upper and lower heating plates becomes zero in a predetermined period. Setting of the production rate and a series of operations such as press timing, shutter timing, transport speed, etc. can be performed by a conventional sequence program.

As the total number of heating, pressing deformation and cooling steps is increased, the production rate can be raised in the molding machine and production method of the present invention. However, in this case, the problem arises that the number of heating plates increases. Therefore, in the molding machine and production method of the present invention, an optimum number of heating, pressing deformation and cooling steps is determined on the basis of a desired size of the molded lens, accuracy required of the lens, the number of the lenses to be produced, thermal characteristics of glass material of the lens, etc.

Figure 9A:
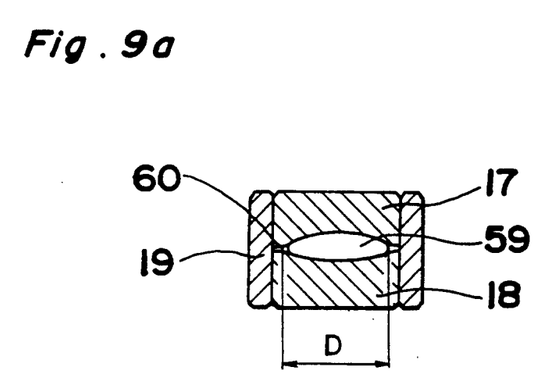
FIGS. 9a and 9b are views showing a molding block used in a method of producing an optical element, according to the present invention.
Figure 9B:
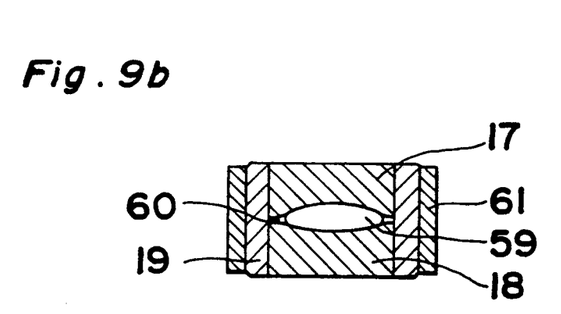

FIGS. 9a and 9b show the molding block subjected to the molding process of the present invention. The molding block is constituted by the cylindrical upper and lower dies 17 and 18, the sleeve die 19 receiving the upper and lower dies 17 and 18 and a molded lens 59. Each of the upper and lower dies 17 and 18 has an optically functional face D formed on its one face confronting the glass blank 20. The sleeve die 19 has an outside diameter of 28 mm, while the upper and lower dies 17 and 18 which are fitted into the sleeve die 19 have a diameter of 20 mm. The molding block has a height of 20 mm. The sleeve die 19 serves not only to bring an optical axis of the optically functional face D of the upper die 17 into alignment with that of the lower die 18 but also to determine central thickness of the molded lens 59. In order to stabilize geometrical accuracy of the molded lens 59, it is desirable that the glass blank 20 be molded within the optically functional face D of the upper and lower dies 17 and 18 such that a heat insulating layer 60 is formed on an outer periphery of the molded lens 59 during cooling. Therefore, regardless of whether the molded lens 59 is a spherical lens or an aspherical lens, the outer periphery of the molded lens 59 is peeled so as to obtain a core portion of the molded lens 59 such that the molded lens 59 has a predetermined outside diameter.

As shown in FIG. 9b, if the sleeve die 19 is enclosed by a second sleeve die 61 made of a material having a small coefficient off thermal conductivity, geometrical accuracy of the molded lens 59 is further stabilized. The second sleeve die 61 is provided for preventing the sleeve die 19 from being cooled faster than an outer peripheral surface of the molding block and may be made of a material having an excellent heat accumulating property.

Figure 10:
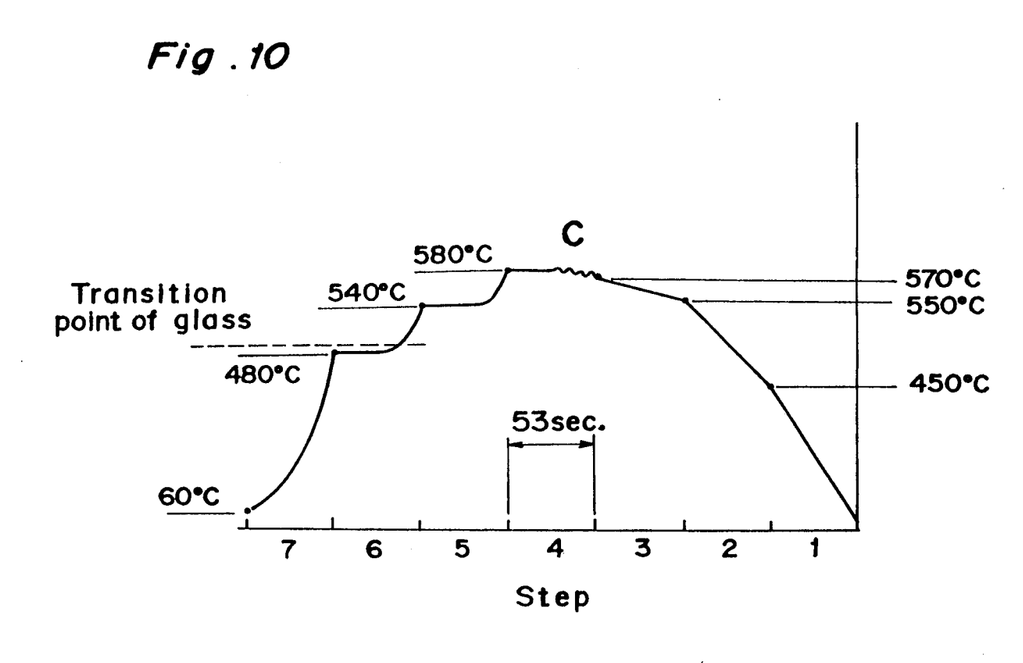

FIG. 10 shows a temperature curve of the molding block used in this embodiment. In the heat zone, the lower heating plates 3–5, and the upper heating plates 10–12, are set at heating temperatures of 450° C., 550° C. and 570° C., respectively. In the pressing plates 13 and 6 is set at a deformation temperature of 580° C. In the cooling zone, the lower heating plates 7–9, and the upper heating plates 14–16, are set at cooling temperatures of 540° C., 480° C. and 60° C., respectively. As shown in FIG. 10, the molding block is held at each pair of the upper and heating plates for 53 sec. The molding block is sequentially heated at the steps 1–3 and the glass blank 20 is subjected to pressing deformation at the step 4. As is seen from the portion C in FIG. 10, deformation lasts for about 10–20 sec. of the 53 sec. and the rest of the 53 sec. is used for performing uniform heating of the molding block as a whole. Then, the molding block is cooled in the steps 5–7. At each of the steps 5–7, the cooling speed is low at an initial stage but, thereafter, assumes a functional cooling curve. The temperature of the deformed glass blank 20 passes through the transition point of glass at the step 6, and then the glass blank 29 is cured such that the molded lens 59 is obtained. At the step 7, the molding block is rapidly cooled and the molding block is disassembled. Thus, a number of the molded lenses 59 having desired performances are obtained. The obtained molded lens 59 is a double convex lens having an outside diameter of 18 mm and a central thickness of 2.9 mm, and opposite convex faces of the molded lens 59 are aspherical. The molded lens 59 has a remarkably high geometrical accuracy of $+1.0 \mu m$ or less with respect to a desired design value. Meanwhile, a desired temperature curve of the molding block can be obtained by arbitrarily combining production rate, temperature of each of the heating, pressing deformation and cooling zones and the number of steps in each of the heating, pressing deformation and cooling zones in accordance with the heat capacity of the upper and lower dies 17 and 18 and the sleeve die 19 and the thermal characteristics of the glass blank 20. For example, in the case where a molding block having a heat capacity smaller than that of the above mentioned molding block is used, the molding block may be heated in steps 1 and 2, deformed at step 3 and cooled at steps 4–7.

Furthermore, in this embodiment, the plates of each pair of upper and lower heating plates are set at identical temperatures. When the molding block is cooled from above and below at identical cooling speeds in the cooling zone, molding free from warpage can usually be performed when opposite faces of the lens have identical shapes. However, when opposite faces of the lens have quite different shapes, for example, in the case of a meniscus lens or a flat-convex lens, etc., warpage of the lens is conspicuous even if the lens is cooled above and below at identical cooling speeds. If the lens is subjected to warpage in one direction in such a case, temperature conditions are set such that one face of the lens opposite to the direction of warpage is cooled. Namely, by providing difference in cooling time for the upper and lower portions of the lens during curing of the lens, the lens can be molded while controlling warpage. A difference in cooling time for the upper and lower portions of the lens can be provided in a method (1) in which the two plates of each pair of upper and lower heating plates are set at different temperatures, respectively, and are brought into contact with the molding block so as to cool the molding block through heat conduction, and a method (2) in which a gap is formed between the molding block and the upper heating plate such that one face of the molding block confronting the gap is radially cooled. In the method (1), heat conduction between the molding block and each heating plate is inclined to become nonuniform slightly due to stain by an oxidized film on contact faces of the molding block and each heating plate.

Thus, in this embodiment, at step 6 which is the most vital cooling step in which the temperature of the molding block passes through the transition point of glass, a gap of 1 mm is formed between the molding block and the upper heating plate 15 and the molding is performed by employing the molding block of FIG. 9 and employing the temperature curve depicted in FIG. 10. As a result, an upward warpage 3 μm or less.

Figure 11A:
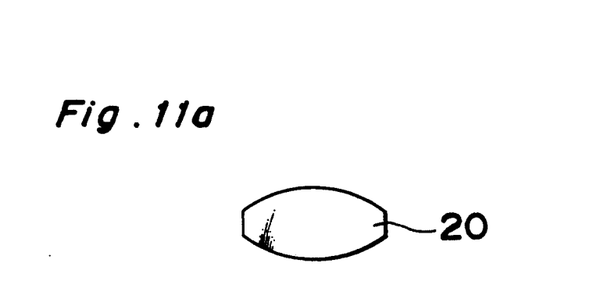
FIGS. 11a, 11b and 11c are sectional views showing glass blanks used in the method of the present invention, respectively.
Figure 11B:
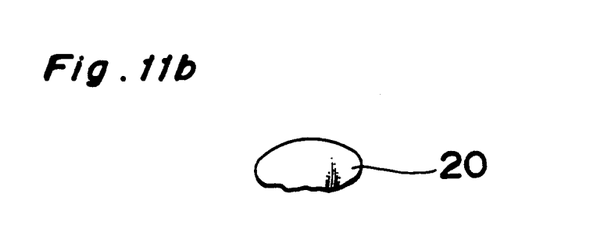
Figure 11C:
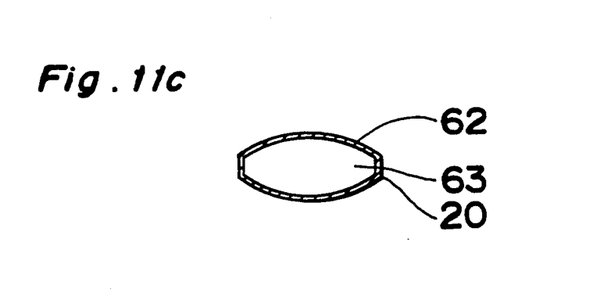

FIGS. 11a to 11c show the glass blank 20 employed in this embodiment. The glass blank 20 is made of barium borosilicate. The glass blank 20 of 11a is a spherical lens obtained by ordinary polishing. The glass blank 20 of FIG. 11b is obtained by directly receiving molten glass on a die and cooling the molten glass for curing. The above mentioned aspherical lens is obtained by washing and molding the glass blank 20 of FIG. 11a or 11b. However, in this case, ordinary molding offers the following problems (1) and (2).

(1) A substance having a low vapor pressure, (borate in this embodiment) is scattered from the glass blank 20 so as to adhere to the die and the lens.

(2) Due to differences in coefficients of thermal conductivity between the die made of metal for general use and the glass blank 20 made of inorganic material, the surface of the glass blank 20 is rapidly heated, and thus minute foaming occurs.

Due to the above described two problems, transmittance is lowered and quality of the molded lens 59 is degraded, so that the molded lens 59 appears tarnished.

The glass blank 20 of FIG. 11c is constituted by an excessive layer 62 (hereinbelow, referred to as a "rich layer") formed on its surface and a bulk layer 63. The rich layer 62 has compositions of a high melting point, while the bulk layer 63 is essentially composed of glass. The glass blank 20 of FIG. 11c is obtained by chemically processing the spherical lens of FIG. 11a. This chemical processing is performed by washing the spherical lens of FIG. 11a with ultrasonic waves by using commercially available detergent mainly containing ammonium citrate and having a pH of 7.

Table 1 below shows chemical the processing period, thickness of the rich layer 62, external appearance of the molded lens and the molding property for the glass blank 20 of FIG. 11c. The thickness of the rich layer 62 is determined by qualitatively examining constituents of glass in the direction of depth by using an Auger electron spectral analyzer. The rich layer 62 has a high melting point and is made of silicon and oxygen free from not only boric acid but also from barium. In example a of Table 1, only ordinary precision washing is performed and the rich layer 62 has a thickness of 100 Å or less. In the molded lens of Example a, slight foaming and deposits are observed. In the molded lens of Example e, sufficient processing cannot be obtained.

TABLE 1

| Example | Chemical processing period (min.) | Thickness of rich layer (Å) | External appearance foaming | External appearance deposit | Molding property |
|---|---|---|---|---|---|
| a | 0 | ≦100 | II or III | II | I |
| b | 1 | ≦200 | I | I | I |
| c | 3 | ≦250 | I | I | I |
| d | 5 | ≦350 | I | I | I |
| e | 10 | ≦550 | I | I | II |

In Table 1 above, character I denotes "good", character III denotes "bad" and character II denotes "slightly bad". It will be seen from Table 1 that when the rich layer 62 is formed to a thickness of 100-500 Å, external appearance and molding property of the molded lens can be remarkably improved. The rich layer (silicon rich layer) 62 having the high melting point exhibits an effect of suppressing production of minute foaming even if there is a large temperature difference at the contact surface between the die and the glass blank. Furthermore, since evaporated constituents are scattered into the rich layer, the rich layer has an effect of delaying scatter of the evaporated constituents to the surface of the molded lens. This effect can be ascertained from the fact that the Auger electron spectral analyzer shows that the surface of the molded lens contains such elements as boric acid, barium, etc. In either to improve external appearance of the molded lens, chemical processing (washing) for molding is quite effective for suppressing production of foaming even if a sharp temperature difference occurs between the molding die and the glass blank.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. An optical element molding machine adapted for use with a molding block having upper and lower molding dies with a glass blank placed therebetween and a sleeve die supporting the upper and lower molding dies, comprising:
a chamber having an inlet for loading the molding block thereinto, and an outlet for discharging the molding block therefrom;
an inlet shutter for opening and closing said inlet;
an outlet shutter for opening and closing said outlet;
gas supply means for introducing nonoxidizing gas into said chamber;
a plurality of lower heating plates mounted in said chamber;
a plurality of upper heating plates mounted in said chamber opposite said plurality of lower heating plates, respectively, to form a plurality of heating plate pairs, one of said upper and lower heating plates of each of said heating plate pairs being movably mounted in said chamber for movement relative to the other of said upper and lower heating plates of each of said heating plates pairs, respectively;
wherein each of said upper and lower heating plates has a molding block pressing portion for contacting a respective one of the upper and lower molding dies of the molding block;
wherein heat insulating plate means are mounted on each of said plurality of upper and lower heating plates for covering substantially all surfaces of said upper and lower heating plates except for said molding block pressing portions thereof;
wherein a heating zone is defined in said chamber by a first plurality of said heating plate pairs, a cooling zone is defined in said chamber by a second plurality of said heating plate pairs, and a deformation zone is defined in said chamber by at least one other of said heating plate pairs; and
wherein a transport means is provided for sequentially moving the molding block through said heating zone, said deformation zone, and said cooling zone.

2. An optical element molding machine as recited in claim 1, wherein
for at least one of said heating plate pairs in each of said heating zone, said deformation zone and said cooling zone, at least one of a heater lead wire, a thermocouple, and a cooling pipe is operably connected to the one of said upper and lower heating plates which is movably mounted in said chamber.

3. An optical element molding machine as recited in claim 2, wherein
for said at least one of said heating plate pairs in each of said heating zone, said deformation zone and said cooling zone, a mounting plate is mounted to said one of said upper and lower heating plates which is movably mounted in said chamber, and said mounting plate has means thereon for preventing fracture of said at least one of said heater lead wire, said thermocouple and said cooling pipe during movement of said one of said upper and lower heating plates which is movably mounted.

4. An optical element molding machine as recited in claim 1, further comprising
release means mounted on at least one of said upper heating plates for releasing said at least one of said upper heating plates from the upper die of the molding block.

5. An optical element molding machine as recited in claim 4, wherein
said release means comprises a pin movably mounted in said at least one of said upper heating plates, and a compression spring urging said pin outwardly of said at least one of said upper heating plates.

6. An optical element molding machine as recited in claim 1, wherein
said heating plate means comprise a vitrified wheel consisting of aluminum oxide and silicon carbide.

7. An optical element molding machine as recited in claim 1, wherein
said upper and lower heating plates are provided with heaters, respectively; and
a gap regulating substance is provided in gaps formed between said heater and said upper and lower heating plates for filling said gaps.

8. An optical element molding machine as recited in claim 7, wherein
said gap regulating substance comprises abrasive polishing grains including aluminum oxide, silicon carbide and zirconium oxide.

9. An optical element molding machine as recited in claim 1, wherein
said ones of said upper and lower heating plates which are movably mounted in said chamber comprise said upper heating plates.

10. An optical element molding machine as recited in claim 9, wherein
said upper heating plates are vertically movably mounted in said chamber for movement toward and away from said lower heating plates, respectively.

11. An optical element molding machine as recited in claim 1, wherein
said ones of said upper lower heating plates which are movably mounted in said chamber are vertically movably mounted in said chamber for movement toward and away from the others of said upper and lower heating plates, respectively.

* * * * *